United States Patent
Pazel et al.

(10) Patent No.: US 7,823,144 B2
(45) Date of Patent: Oct. 26, 2010

(54) COMPUTER PROGRAM CODE COMPARISON USING LEXEMES

(75) Inventors: Donald P Pazel, Montrose, NY (US); Pradeep Varma, New Delhi (IN)

(73) Assignee: International Business Machines Corporation, Armonk, NY (US)

(*) Notice: Subject to any disclaimer, the term of this patent is extended or adjusted under 35 U.S.C. 154(b) by 1336 days.

(21) Appl. No.: 11/321,178

(22) Filed: Dec. 29, 2005

(65) Prior Publication Data

US 2007/0157183 A1 Jul. 5, 2007

(51) Int. Cl.
G06F 9/44 (2006.01)
G06F 17/00 (2006.01)
G10L 15/06 (2006.01)

(52) U.S. Cl. ............ 717/168; 717/110; 715/239; 715/255; 704/243; 704/244

(58) Field of Classification Search ............ 717/142, 717/110, 168; 715/239
See application file for complete search history.

(56) References Cited

U.S. PATENT DOCUMENTS

| | | | |
|---|---|---|---|
| 5,860,007 A | 1/1999 | Soni et al. | |
| 6,260,020 B1 | 7/2001 | Ruffin et al. | |
| 6,334,215 B1 | 12/2001 | Barker et al. | |
| 7,103,838 B1* | 9/2006 | Krishnamurthy et al. | 715/202 |
| 7,240,279 B1* | 7/2007 | Chartier et al. | 715/210 |
| 2002/0143522 A1* | 10/2002 | Storisteanu et al. | 704/1 |
| 2003/0009744 A1* | 1/2003 | Doyle et al. | 717/120 |
| 2003/0023963 A1 | 1/2003 | Birkholtz et al. | |
| 2003/0115574 A1* | 6/2003 | Garvey | 717/120 |
| 2003/0229890 A1 | 12/2003 | Lay et al. | |
| 2004/0015942 A1 | 1/2004 | Branson | |
| 2004/0153994 A1* | 8/2004 | Bates et al. | 717/110 |
| 2004/0194055 A1 | 9/2004 | Galloway et al. | |
| 2004/0255291 A1 | 12/2004 | Sierer et al. | |
| 2005/0022176 A1 | 1/2005 | Ramachandran et al. | |
| 2005/0049906 A1 | 3/2005 | Leyann | |

OTHER PUBLICATIONS

Leitao et al. (A Formal Pattern Language for Refactoring of LISP Programs, Proceedings of Sixth European Conference on Software Maintenance and Reengineering, 2002, p. 186-192).*

Tichy, Walter F. "*The String-to-String Correction Problem with Block Moves*", ACM Transactions on Computer Systems, Nov. 1984, pp. 309-321, vol. 2, No. 4.

Veck et al., "*Software Solutions Kit for e-business*", IBM Research Disclosure n452, Dec. 2001, Article 1, 2001.

(Continued)

*Primary Examiner*—Lewis A Bullock, Jr.
*Assistant Examiner*—Hang Pan
(74) *Attorney, Agent, or Firm*—Jeffrey T. Holman

(57) ABSTRACT

A method, apparatus and computer program product for comparing two computer program codes is disclosed. For each code, a stream of lexemes is generated for the program text of each code. The streams are concatenated in the same order as the program text. The two concatenated streams of lexemes are compared on a language-type by language-type basis to identify lexemes present only in one stream. The comparison derives a set of edit operations including minimal text block moves needed to convert one program code into the other program code.

18 Claims, 4 Drawing Sheets

OTHER PUBLICATIONS

Talley, TM, "*Configuring File Servers From Hosts.*", IBM Technical Disclosure Bulletin, n3a 08-90, p. 194, 1990.

Aho, A. V., Sethi, R., Ullman, J. D., "*Compilers Principles, Techniques, and Tools*", Addison-Wesley Publishing Company, Reading, Massachusetts, Jun. 1987, Chapter 3.

Hunt. J. W., McIlroy, M. D., "*An algorithm for differential file comparison*", Computer Science Tech, Rep. 41, AT&T Bell Laboratories, Murray Hill, NJ, Jun. 1976.

http://www.gnu.org/software/autoconf/manual/autoconf-2.57/ps/autoconf.ps.gz.

* cited by examiner

COMPUTER PROGRAM CODE COMPARISON USING LEXEMES

FIELD OF THE INVENTION

This invention relates to the field of computer programs, and particularly to the comparison of such programs using lexemes, for example in the deployment of new or upgraded code.

BACKGROUND

Software maintenance is widely recognized as the dominant cost phase in the lifecycle of computer programs. One primary activity in software maintenance is migrating code from one platform to another. A substantial effort goes into determining the boundaries of the software being migrated from the myriad of code artifacts resident on the source platform. While application files that have to be migrated in their entirety are relatively simple to identify, and tools exist to assist similar inventory tasks (e.g. GNU Autoconfig determines the support available in a given environment refer to http://www.gnu.org/software/autoconf/manual/autoconf-2.57/ps/autoconf.ps.gz), determining bounds of application code where it merges with third-party software packages is harder to discern.

The diff utility finds differences in two files and presents its results line by line in many formats selectable by command options. The diff algorithm in Hunt, J. W., and McIlroy, M. D., "An algorithm for differential file comparison", Computing Science Tech. Rep. 41, AT&T Bell Laboratories, Murray Hill, N. J., June 1976 uses an LCS (longest common subsequence) technique. However, interpreting the textual differences obtained by diff can be a hard task.

Given the increasing use of open-source software, the code merge problem is only increasing with time.

SUMMARY

The invention broadly compares two computer program codes by generating a stream of lexemes for the program text of each said code, and comparing the two streams of lexemes to identify lexemes present only in one stream.

Additionally, the invention compares two computer program codes to detect actual code changes between the program codes. For each code streams of lexemes for the program text of each is generated, and the streams are concatenated in the same order as the program text. The two concatenated streams of lexemes are compared on a language-type by language-type basis to identify lexemes present only in one stream.

Yet further, the invention detects edit patterns on a comparison of a source data string and a target data string. This is performed by lexically parsing the source data string and the target data string into lexemes. Edit sequences are determined for converting the source lexeme stream to the target lexeme stream. Edit patterns are detected on the editing sequences.

An extensible, code inventory aide tool for robustly handling and analyzing deployments of third-party package codes (headers, and sources if available) for user extensions/ customizations is disclosed. Such a tool has application in migrating code from one platform to another, wherein the third party package version on the target platform has to be modified analogously as on the source platform for the migration to be proper and complete.

The invention is based on lexemes as the minimal atomic symbol of manipulation. A deployed package and standard package are lexed using multiple language/dialect lexers to derive canonical lexeme streams which are used to formulate and solve a string correction problem in order derive the minimum set of text move operations needed to convert one stream into another. The lexeme streams and identified edit operations comprise the base form on which individual rules execute. Individual edits are formed into groups with attached explanations that can be stored and/or displayed to the user as the highest-level explanation of non-standard package use (user code/code customization) found by the tool.

The solution disclosed is capable of handling code written in multiple languages/dialects. The multiple languages/dialects can be intermixed within a file, often in large real-world applications.

While explanation rules can be fully self-contained, they also have the option of leveraging external tools that may be available in the operating environment, via isolated external tool process forks. Eligibility of rules for execution depends upon the availability of any external support used.

Code changes can be of the following sorts—subsetting (to reduce package footprint), subpackage substitution (to use say custom or another-party libraries), package function extension, refactorings such as entity names, etc. The tool is extensible, so its ability to explain these and other kinds of changes depends upon a set of rules stored in its knowledge base. In addition, rules that search through and relate comments can provide a higher-level insight than obtainable from only code manipulation.

Rules themselves are free to use as much support (e.g. YACC, GCC, JavaCC) as may be available in the (client) operating environment to carry out lightweight parsing and analysis for discovering deeper change patterns.

While prior-art system tools such as diff can be used to compare a deployed package with its standard counterpart, they offer no language-specific processing support to explain the differences. Indeed, capturing differences in terms of lines of text is a fairly crude form especially when the change may be small compared to an entire line itself. Regardless, nuances, pertaining to preprocessing of directives/pragmas, comments, code, and languages/dialects are all lost.

To work at the level of lexemes (wherein comments and preprocessing directives are either stripped or caught as special-purpose lexemes as and when needed), offers the right edifice to build a language-level explanation of customization changes.

DETAILED DESCRIPTION

Lexeme Generator

Figure 1:
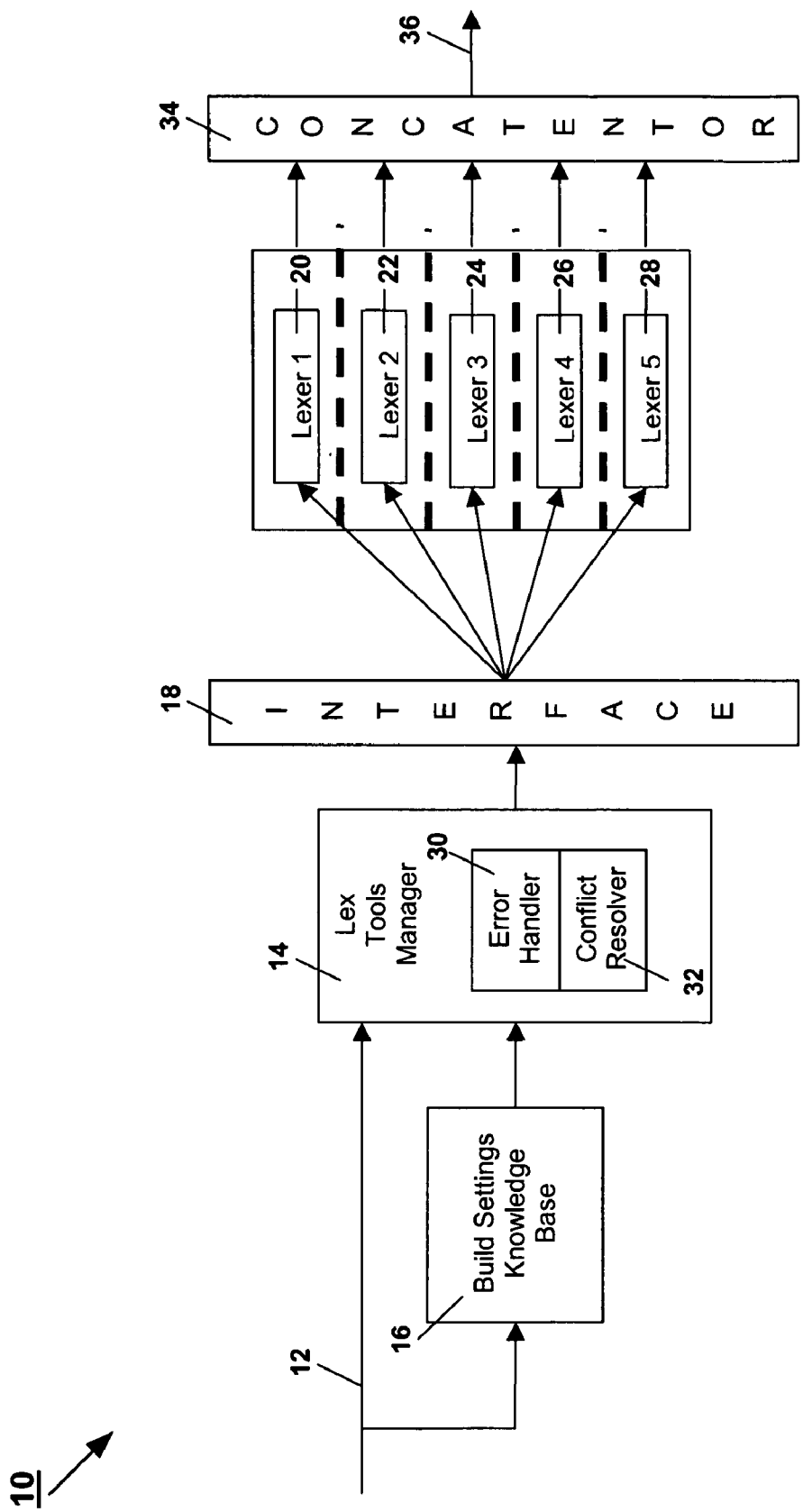
FIG. 1 is a schematic block diagram of a lexeme generator.

FIG. 1 shows the architecture of a multi-language/dialect lexeme generator 10. A third-party software package 12 being analysed is input to a Tools Manager 14 and to a Build Settings Knowledge Base 16. The input comprises a set of package files being included in user code files, and the build settings (e.g. defined symbols, global variables) in effect at the time of each file's inclusion. The build settings used to compile and/or link the package 12 in its use context are stored in the Build Settings Knowledge Base 16. The output of the Tools Manager 14 passes via an interface 18 to a set of lexer instances 20, 22, 24, 26, 28. Each lexer instance 20-28 has full language processing capability up to the lexing level (e.g. includes pre-processing capability). Each lexer instance 20-28 is dedicated to a discrete language or dialect and may be configured by the invocation of a lexer module for the language using dialect flags as appropriate. In that case, there will be minimally as many lexer instances (hereafter lexers) as there are languages and dialects in the software package 12, and that five are shown is representative only. There can be more lexers than the present languages/dialects if the lexers required for the languages/dialects are not all available and approximation using other lexers has to be carried out.

The build settings configure and invoke the individual lexers 20-28 for individual languages by the means used in compilers for the respective languages.

Each of the lexers 20-28 operates to generate maximal sub-sequences of lexemes for the program text provided by the package 12. Each sub-sequence ends when the character sequence encountered by a lexer becomes unacceptable to it. The resulting exception is caught by the error handler 30 and lexing using the same lexer is re-attempted at the earliest next character that is acceptable to the lexer. Thus, starting from the first character provided by a user-included header file of the package 12 all the way to the end of the user's inclusion, a lexer tries to create as many legitimate lexemes that it can. Based upon language conventions and build settings, the start and end of a lexer's invocation are pruned to smaller character sets in cases where their application is known to be restricted; e.g. a scripting language's lexer is invoked only on the argument of a system call containing the script.

A detailed introduction and treatment of lexing can be found in chapter 3 of Aho, A. V., Sethi, R., Ullman, J. D. "Compilers Principles, Techniques, and Tools", Addison-Wesley Publishing Company, Reading, Massachusetts, June 1987, the contents of which are incorporated herein by reference in its entirety.

Sequences of lexemes along with their starting and ending positions in the package text are noted, and a canonical stream of lexemes is built by ensuring that no position is represented in more than one lexeme. Overlap in the lexeme streams is resolved interactively by a dialog with the user and a resolver module 32 whereby the overlap is displayed to the user and the user required to strike off all but one lexeme (per position) for the final stream.

The final stream 36 is generated by a concatenator 34 and comprises of lexeme sub-sequences obtained from individual lexers 20-28 concatenated together in the same order as the lexemes' positions in the package text. If the final stream 36 does not cover all the positions in the package text, then more lexers are configured and applied towards lexeme sub-sequence generation in order to derive a complete lexical stream for the package concerned. If configuring more lexers does not obtain complete coverage of the package sources, the uncovered characters are marked as special-purpose lexemes to be treated analogously as comment lexemes (discussed later) in the program analysis.

As an example, consider a local refactoring in the following code fragment.

```
float sinecosine(theta) {
    return sine(theta) * cosine(theta);
}
```

The refactoring changes the argument variable "theta" to the units it is measured in, say "degrees". The lexeme sequence generated for the function above, where lexemes are separated by commas is: float, sinecosine, (, theta, ), {, return, sine, (, theta, ), *, cosine, (, theta, ), ;, }. The lexeme sequence generated for the changed function comprises: float, sinecosine, (, degrees, ), {, return, sine, (, degrees, ), *, cosine, (, degrees, ), ;, }. From these lexeme sequence descriptions, the change between the functions has to be diagnosed as a local name refactoring, which our work carries out as described next.

Generating Code Change Descriptions

Figure 2:
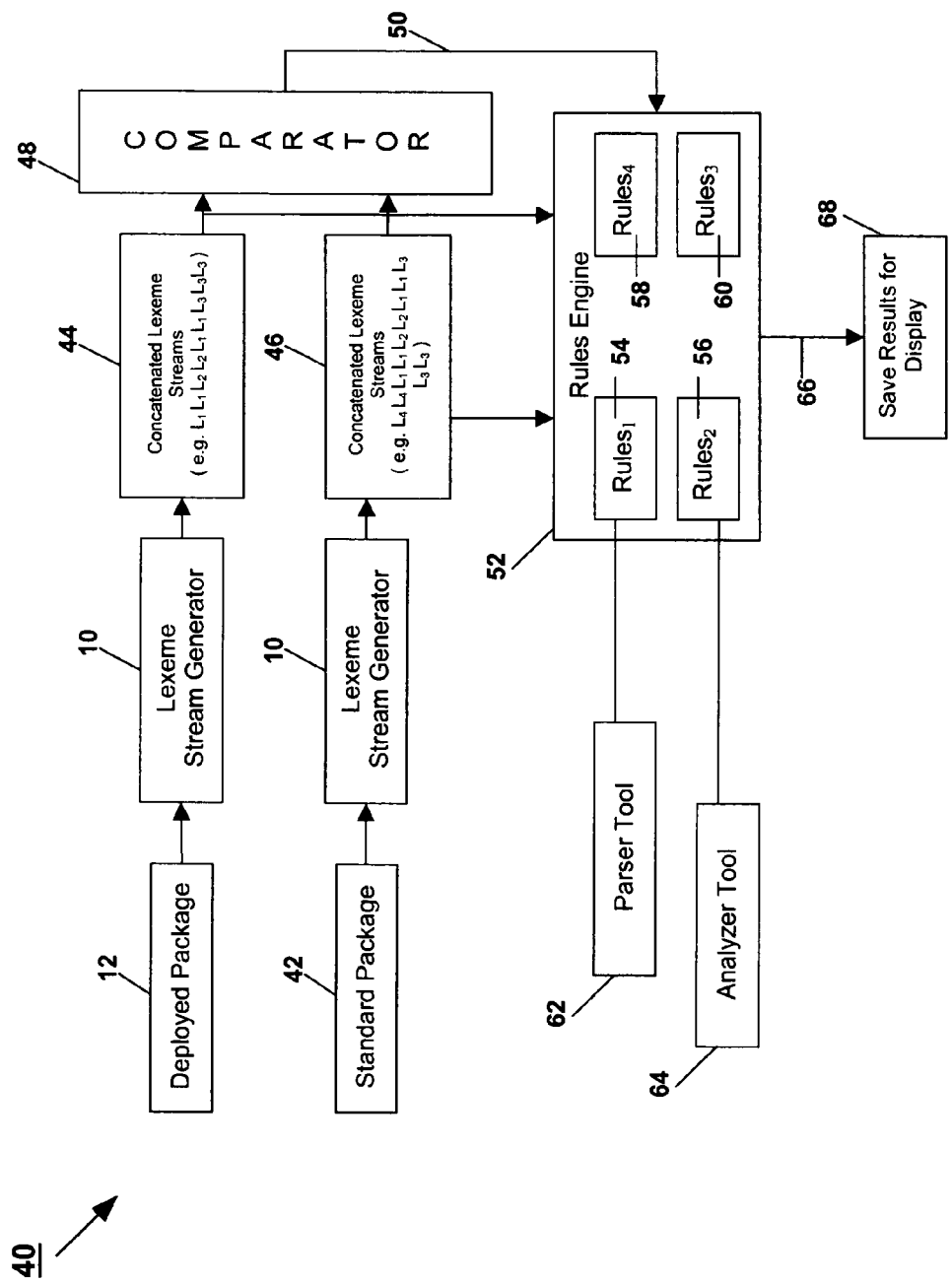
FIG. 2 is a schematic block diagram of an architecture for generating high-level descriptions of code changes.
Figure 3:
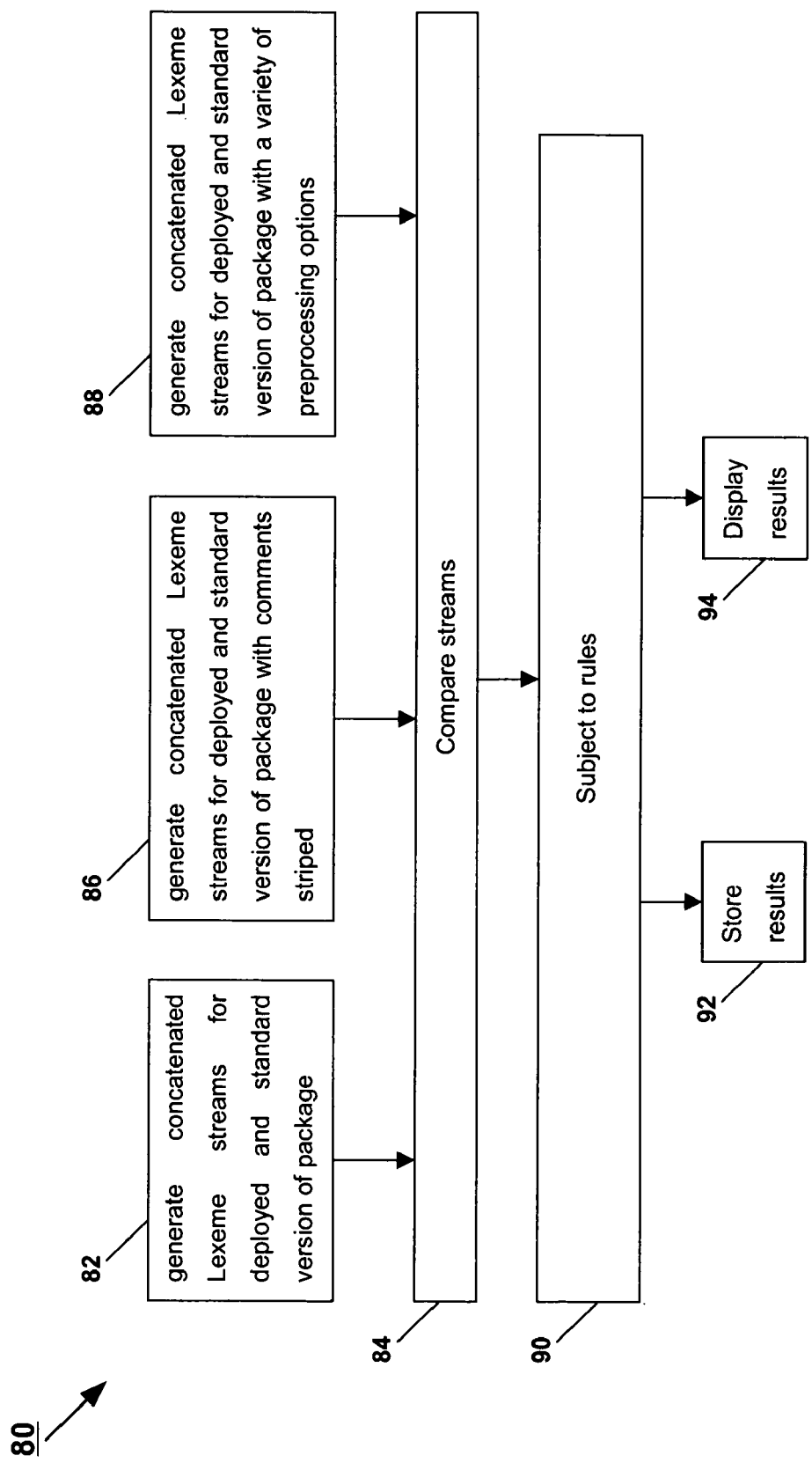
FIG. 3 is a schematic block flow diagram using the architecture of FIG. 2.

Referring now to FIGS. 2 and 3, the generation of high-level code change descriptions will be described. In the architecture 40, lexeme streams 44, 46 are generated for both the deployed package 12 and its standard version 42 using the lexeme stream generator 10 of FIG. 1, to be received by a comparator module 48. The comparator 48 implements a string correction algorithm as taught in Tichy, Walter F. "The String-to-String Correction Problem with Block Moves", ACM Transactions on Computer Systems, Vol. 2, No. 4, November 1984, Pages 309-321, the contents of which are incorporated herein by reference in its entirety.

For two strings, S and T over an alphabet A with $\alpha$ symbols, the algorithm by Tichy constructs block moves of text from S to T so that S gets converted into T. A block move represents a non-empty common substring of S and T with length 1, starting at a position p in S and q in T. A covering set of T with respect to S comprises a set of block moves such that every symbol T[i] that also appears in S is included in exactly one block move. The algorithm finds a minimal covering set of T with respect to S such that the number of block moves in the set is less than or equal to the number of block moves in all covering sets. Next, symbols in T not found in S are new symbols introduced in T. Thus every symbol in T either gets ascribed to a source symbol in S or identified as a new symbol.

The comparator module 48 uses Tichy's method to solve the string correction problem where lexemes make up the set of atomic symbols. Each lexer's lexemes make up a disjoint set of symbols so that the string correction problem is solved intra language/dialect only. Thus inter-language string corrections are not entertained and hence the solution is cognizant of language nuances. An optional optimization is to tag lexeme symbols with lexeme kinds so that corrections do not mix between lexeme kinds either.

Lexemes thus comprise the atomic symbols of the string correction problem. The comparator 48 solves the string correction problem, deriving a set of edit operations 50 including minimal block moves needed to convert the standard package into the deployed package.

The edit operations 50 and the individual lexeme streams 44, 46 comprise the basic form that a Rules Engine 52 operates upon. Individual rules 54, 56, 58, 60 test for patterns in the edit operations in order to partition them as subsetting operations, subpackage substitution operations, function extension operations, name refactorings etc. The rules 54-60 may depend upon external tool support, shown as an External Parser 62 and an External Analyzer 64. For rules dependent upon external tools to be eligible for execution, the external tools have to be available in the operating environment. Since a common scenario for use is on customer premises and customer machines, the availability of such external tools cannot be guaranteed. Thus some of the rules may be optional, i.e. eligible and used whenever possible. Being able to leverage the operating environment to its fullest extent keeps the tool footprint light, its size increasing in a virtual sense by the external tools found in the operation environment. External tools invocations by individual rules are carried out in a separate process from the code description change inventory process.

The output 66 of the Rules Engine 52 is stored in a convenience memory location 68.

The overall flow 80 of the inventory aide tool is shown in FIG. 3. In the step 82, the workflow of FIG. 2 (as described above) is invoked for source settings wherein the lexeme generators 10 for the deployed and the standard packages are set for converting comments, pre-processor directives, pragmas, etc. into special-purpose lexemes in the lexeme streams themselves. The pre-processor directives/pragmas are not acted upon, and treated in a comment-like manner in this step. Thus recursive file inclusion is not carried out in this step. In the step 84, the concatenated streams 44, 46 are compared in the comparator 48. Comments are lexed as natural language text and saved as comment lexemes. Lexing natural language text may be standardized as a separate lexer, that for example treats whitespace as the sole delimiter of tokens in the lexing process. This setting enables high-level change descriptions in comments to be leveraged in the process of explaining package customizations. In the step 86, the workflow of FIG. 2 is repeated with all program comments removed in order to focus upon explaining actual code changes.

In the step 88, the process is repeated with various preprocessing settings next (e.g. macro inlining enabled or not) to explain lexeme stream differences all the way up to the full build settings (wherein full pre-processing is carried out) found in the actual use context of the deployed package. While pre-processor directives are acted upon, they are also saved as special-purpose lexemes prior and after their processing so that the lexemes generated as a consequence of their processing are clearly demarcated. Thus a file's inclusion is marked both at its beginning and end by special-purpose lexemes obtained from the causing inclusion directive. Conditionally compiled and uncompiled regions are demarcated by their pre-processing directives and generate standard lexemes for the compiled regions and nominally, pre-processing tokens as lexemes for the uncompiled regions Step 90 comprises application of plug-able rules to the lexeme streams and edit operations generated as a result of a preceding step. Each rule is a program component (e.g. class or function), which carries out interpretive activities over the lexeme streams and edit operations. Examples of such components are discussed later. The result of each rule's application are stored in step 92 to be presented in any desired sequence in step 94 as required. Thus the rules operational upon lexeme streams and edit operations generated by the application of step 82 can precede or succeed the rules operational upon the application of step 86 or 88. The results of each application are stored independently and presented to a user in any preferred sequence. The set of rules to be applied is also user-determined, with the user having the option of dropping application of subsets of rules among the eligible ones.

The standard package and deployed package are lexed with identical settings at any time in the workflow of FIG. 3. Since the packages can differ in terms of the file inclusion statements, in step 88, processing the standard package may not progress due to missing 'includes' in the customer/source environment, which is oriented towards customized package processing. A missing 'include' is noted as a single failure lexeme, which is demarcated as usual by the include pragma lexemes. Thus lexing of the standard package always succeeds, only that its completeness at all times cannot be guaranteed and further analysis inside the missing regions is not carried out.

Rules

The rules 52-60 for capturing and explaining change patterns can be many, and examples are as follows. Name refactoring can be diagnosed when it is found that one specific symbol lexeme has changed to another symbol lexeme in many places and not into anything else anywhere else. This diagnosis can be further assisted and identified as a potential local name refactoring if the rule has at its disposal a lightweight parser (maybe from an external tool) that identifies if all the instances fall in the same global entity definition. The diagnosis is certain if a deep parsing analysis is further available which constructs the nested lexical scope and symbol table identifying the exact refactoring.

The rule for identifying subpackage substitution computes on the lexeme streams generated for full build settings (post all preprocessing). Thus all conditional compilation branches are known and package inclusion trees fully understood. At these settings, the sequence of file-inclusion lexemes for the standard package is compared with the sequence for the deployed package. Use of different files in the two identifies substitutes used in the deployed package. The confidence in this diagnosis can be enhanced further by checking if the replacing files overlap substantially with the replaced files in terms of the sequence of globally-declared entities (types, function declarations, variables, constants, etc.) and the availability of a lightweight parser can help do this further verification.

The rule for package subsetting is a special case for package substitution in that the replacing files comprise a null set and that the set of used package files are a subset of the complete package. This enables deletion of unused files in the customized package. Further accuracy in such a diagnosis comes about if the rule also checks and verifies that no added files elsewhere provide an overlapping set of global entities as the deleted files.

Package function extension can be diagnosed if added header files are found in the customized package. This diagnosis is further strengthened if the global entities in the added files do not overlap with any global entities in any deleted files.

Analysis of documentation (comment) lexemes can yield significant high-level interpretative value. For this, comment lexemes extracted from the lexeme stream can be compared for differences in the standard and deployed package. The comparison can reuse the string correction problem formulation of Tichy referred to above. The analysis can be further enhanced by including in the comments lexeme stream, key contextual lexemes for the comments, such as the neighboring global entity names that the comments (most likely) explain.

Discussion

The invention embodied herein is based on the observation that lexemes are the right kind of atomic symbols pertinent to analysing programs using string comparison techniques. The specific lexemes built for program comparison represent one of the novel aspects of the present invention. The lexemes are effectively language tagged, so that program comparison occurs only within lexemes of the same language. The lexemes are optionally lexeme kind tagged, so that program comparison is further restricted to only symbols of the same type (e.g. language keywords and user-defined names are not compared). Pre-processor directives are captured as special-purpose lexemes for reference within program analysis procedures. Comments are lexed in a distinct natural language form, using say whitespace as lexeme delimiters. Multiple lexers are invoked to derive a lexeme sequence covering a code source. A variety of such lexeme sequences are generated to view the code source with different perspectives (e.g. pre-processing On or Off).

The tool disclosed is lightweight and robust and hence is suitable for use by software migration service providers in client engagements wherein the provider deploys the said tool on client machines and performs code inventory on client premises. The features of small footprint (lightweight) and robust behaviour are required for such engagements since little can be assumed about the operating conditions of client machines and non-intrusive behaviour (e.g. cause no crashes, thrashing, finish fast) is the minimum expected from the provider side.

In terms of applications, embodiments of the invention can be used to provide text change explanations, with each rule indicating a broader semantic indication of the meaning of located changes, as was discussed earlier. Related to this, embodiments can be used to validate changes between source and target data streams, in the sense that the given explanations could be checked for membership to an acceptable set of changes relevant to the domain application of this invention.

It should also be appreciated that in the course of examining edit sequences from one or more source and target data stream comparisons, the human practitioner or executing machine may observe patterns, for example based on repetition. These may then be inferred into new rules which can be used in further text comparison. In some cases, the rule can be rendered by the human practitioner as a computer program, being an abstraction for general means for further detection of the pattern. In other cases, abstraction or generalization can be obtained through combining relevant edit pattern detections on a case-by-case basis, to formulate a rule comprising a detection of any of those cases.

It should also be noted that the lexeme pattern detection and rule mechanism mentioned hereon generalizes to text documents other than computer programming. In this regard, the rule pattern detection technique outlined in this teaching can be applied appropriately to other domains. For example, legal documents may be compared on revisions, for example, for changes in claims. Music scores, while not textual in the usual sense, but textual in a data stream sense, can also be analysed for edit pattern changes in the spirit of this teaching.

Computer Platform

Figure 4:
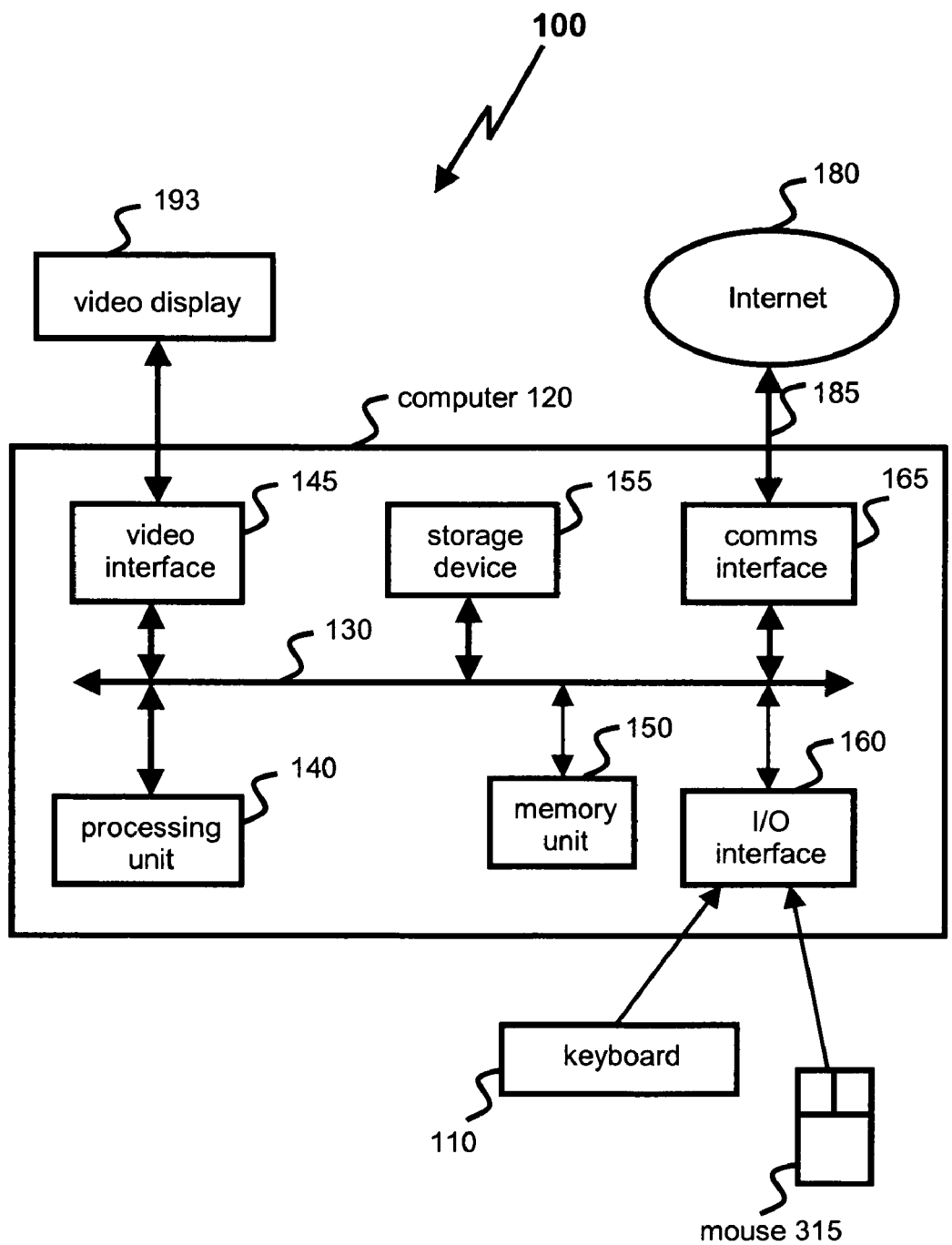
FIG. 4 is a schematic block diagram of a computer system that can be used to implement the generator, architecture and method of FIGS. 1 to 3.

FIG. 4 shows a schematic block diagram of a computer system 100 that can be used to practice the methods described herein. More specifically, the computer system 100 is provided for executing computer software that is programmed to generate lexemes from program code, and to generate code change descriptions between two or more code bodies. The computer software executes under an operating system such as MS Windows 2000, MS Windows XP™ or Linux™ installed on the computer system 100.

The computer software involves a set of programmed logic instructions that may be executed by the computer system 100 for instructing the computer system 100 to perform predetermined functions specified by those instructions. The computer software may be expressed or recorded in any language, code or notation that comprises a set of instructions intended to cause a compatible information processing system to perform particular functions, either directly or after conversion to another language, code or notation.

The computer software program comprises statements in a computer language. The computer program may be processed using a compiler into a binary format suitable for execution by the operating system. The computer program is programmed in a manner that involves various software components, or code, that perform particular steps of the methods described hereinbefore.

The components of the computer system 100 comprise: a computer 120, input devices 110, 115 and a video display 190. The computer 120 comprises: a processing unit 140, a memory unit 150, an input/output (I/O) interface 160, a communications interface 165, a video interface 145, and a storage device 155. The computer 120 may comprise more than one of any of the foregoing units, interfaces, and devices.

The processing unit 140 may comprise one or more processors that execute the operating system and the computer software executing under the operating system. The memory unit 150 may comprise random access memory (RAM), read-only memory (ROM), flash memory and/or any other type of memory known in the art for use under direction of the processing unit 140.

The video interface 145 is connected to the video display 190 and provides video signals for display on the video display 190. User input to operate the computer 120 is provided via the input devices 110 and 115, comprising a keyboard and a mouse, respectively. The storage device 155 may comprise a disk drive or any other suitable non-volatile storage medium.

Each of the components of the computer 120 is connected to a bus 130 that comprises data, address, and control buses, to allow the components to communicate with each other via the bus 130.

The computer system 100 may be connected to one or more other similar computers via the communications interface 165 using a communication channel 185 to a network 180, represented as the Internet.

The computer software program may be provided as a computer program product, and recorded on a portable storage medium. In this case, the computer software program is accessible by the computer system 100 from the storage device 155. Alternatively, the computer software may be accessible directly from the network 180 by the computer 120. In either case, a user can interact with the computer system 100 using the keyboard 110 and mouse 115 to operate the programmed computer software executing on the computer 120.

The computer system 100 has been described for illustrative purposes. Accordingly, the foregoing description relates to an example of a particular type of computer system such as a personal computer (PC), which is suitable for practicing the methods and computer program products described hereinbefore. Those skilled in the computer programming arts would readily appreciate that alternative configurations or types of computer systems may be used to practice the methods and computer program products described hereinbefore.

Embodiments of methods, systems and computer program products have been described hereinbefore relating to the comparison of standard and deployed program code to generate code change descriptions. The foregoing detailed description provides exemplary embodiments only, and is not intended to limit the scope, applicability or configurations of the invention. Rather, the description of the exemplary embodiments provides those skilled in the art with enabling descriptions for implementing an embodiment of the invention. Various changes may be made in the function and arrangement of elements without departing from the spirit and scope of the invention as set forth in the claims hereinafter.

Where specific features, elements and steps referred to herein have known equivalents in the art to which the invention relates, such known equivalents are deemed to be incorporated herein as if individually set forth. Furthermore, features, elements and steps referred to in respect of particular embodiments may optionally form part of any of the other embodiments unless stated to the contrary.

We claim:

1. A method for comparing two computer program codes in a computer, the method comprising:
   generating a stream of lexemes for the program text of each said code;
   comparing the two streams of lexemes to identify lexemes present only in one stream;
   determining an editing sequence for a conversion between the two streams of lexemes;
   programmatically applying a rule to test for an edit pattern on the editing sequence;
   concatenating the two lexeme streams in the same order as the program text;
   utilizing an extensible rule-system of which said rule embodies a subset of lexeme edit sequences by which one of the lexeme streams is converted to the other lexeme stream; and
   storing an output of the test in a memory location.

2. The method of claim 1, wherein said comparing step derives a set of edit operations including minimal text block moves needed to convert one said program code into the other said program code.

3. A method for comparing two computer program codes in a computer, the method comprising:
   for each said code:
   (i) generating a stream of lexemes for the program text of each said code,
   wherein each code is stored on a computer readable storage medium; and
   (ii) concatenating said streams in the same order as the program text;
   comparing the two concatenated streams of lexemes on a language-type by language-type basis to identify lexemes present only in one stream;
   determining an editing sequence for a conversion between the two streams of lexemes;
   progamatically applying a rule to test for an edit pattern on the editing sequence; and
   utilizing an extensible rule-system, of which said rule embodies a subset of lexeme edit sequences by which one of the lexeme streams is converted to the other lexeme stream.

4. The method of claim 3, wherein said comparing step derives a set of edit operations including minimal text block moves needed to convert one said program code into the other said program code.

5. A method for detecting edit patterns on a comparison of a source data string and a target data string in a computer, comprising the steps of:
   lexically parsing said source data string and said target data string into lexemes;
   determining edit sequences for converting said source lexeme stream to said target lexeme stream;
   programmatically detecting edit patterns on said editing sequences, comprising:
      concatenating said source and target lexeme streams in the same order as the source text; and
      comparing the two concatenated streams of lexemes to identify lexemes present only in one stream;
      wherein the detection step utilizes an extensible rule-system, of which said rule embodies a subset of lexeme edit sequences by which the source lexeme stream is converted to the target lexeme stream; and
   storing the edit patterns in a memory location.

6. The method of claim 5, wherein the source data string represents computer program text and the target source data string represents a modified version of the computer program text.

7. The method of claim 5, wherein one of said rules detects name re-factoring.

8. The method of claim 5, wherein one of said rules identifies sub-package substitution.

9. The method of claim 5, wherein one of said rules identifies package subsetting.

10. The method of claim 5 wherein one of said rules diagnoses package function extension.

11. The method of claim 5, wherein the edit sequences found in one or more source and target data string comparisons are formulated as new pattern rules for successive text comparisons.

12. Apparatus for comparing two computer program codes in a computer, the apparatus comprising:
   means for generating a stream of lexemes for the program text of each said code;
   means for concatenating said streams in the same order as the program text;
   means for comparing the two concatenated streams of lexemes on a language-type by language-type basis to identify lexemes present only in one stream;
   means for determining an editing sequence for a conversion between the two streams of lexemes;
   means for programmatically applying a rule to test for an edit pattern on the editing sequence;
   means for utilizing an extensible rule-system, of which said rule embodies a subset of lexeme edit sequences by which one of the lexeme streams is converted to the other lexeme stream; and
   means for storing an output of the test in a memory location.

13. A computer program product comprising a computer useable storage medium having a computer readable program, wherein the computer readable program when executed on a computer causes the computer to:
   generate a stream of lexemes for the program text of each said code;
   compare the two streams of lexemes to identify lexemes present only in one stream;
   determine an editing sequence for a conversion between the two streams of lexemes;
   programmatically apply a rule to test for an edit pattern on the editing sequence; concatenate the two lexeme streams in the same order as the program text;
   utilize an extensible rule-system, of which said rule embodies a subset of lexeme edit sequences by which one of the lexeme streams is converted to the other lexeme stream; and
   store an output of the test in a memory location.

14. A computer program product comprising a computer useable storage medium having a computer readable program, wherein the computer readable program when executed on a computer causes the computer to:
   for each said code:
   (i) generate a stream of lexemes for the program text of each said code; and
   (ii) concatenate said streams in the same order as the program text; and compare the two concatenated streams of lexemes on a language-type by language-type basis to identify lexemes present only in one stream;

determine an editing sequence for a conversion between the two streams of lexemes;

programmatically apply a rule to test fir an edit pattern on the editing sequence; and utilize an extensible rule-system, of which said rule embodies a subset of lexeme edit sequences by which, one of the lexeme streams is converted to the other lexeme stream.

15. A computer program product comprising a computer useable storage medium having a computer readable program, wherein the computer readable program when executed on a computer causes the computer to:

lexically parse said source data string and said target data string into lexemes;

determine edit sequences fir converting said source lexeme stream to said target lexeme stream;

programmatically detect edit patterns on said editing sequences; and concatenating said source and target lexeme streams in the same order as the source text;

wherein the detection step utilizes an extensible rule-system, of which said rule embodies a subset of lexeme edit sequences by which the source lexeme stream is converted to the target lexeme stream.

16. The method of claim 1, wherein applying the rule to test for an edit pattern depends upon external tool support from an external parser and an external analyzer that arc available in an operating environment outside of a lexeme generator.

17. The method of claim 1, wherein the rule comprises one or more rules of a set of rules to be applied to test for the edit pattern, wherein the set of rules to be applied is user-determined.

18. The method of claim 1, wherein generating the stream of lexemes for the program text of each code further comprises generating a special-purpose lexeme for non-program text of each code, wherein the non-program text comprises:

comment text; or a pre-processing directive.

* * * * *